Feb. 23, 1971 N. F. ABRAHAM 3,564,734
COLOR COLLATING DEVICE
Filed April 4, 1969 2 Sheets-Sheet 1
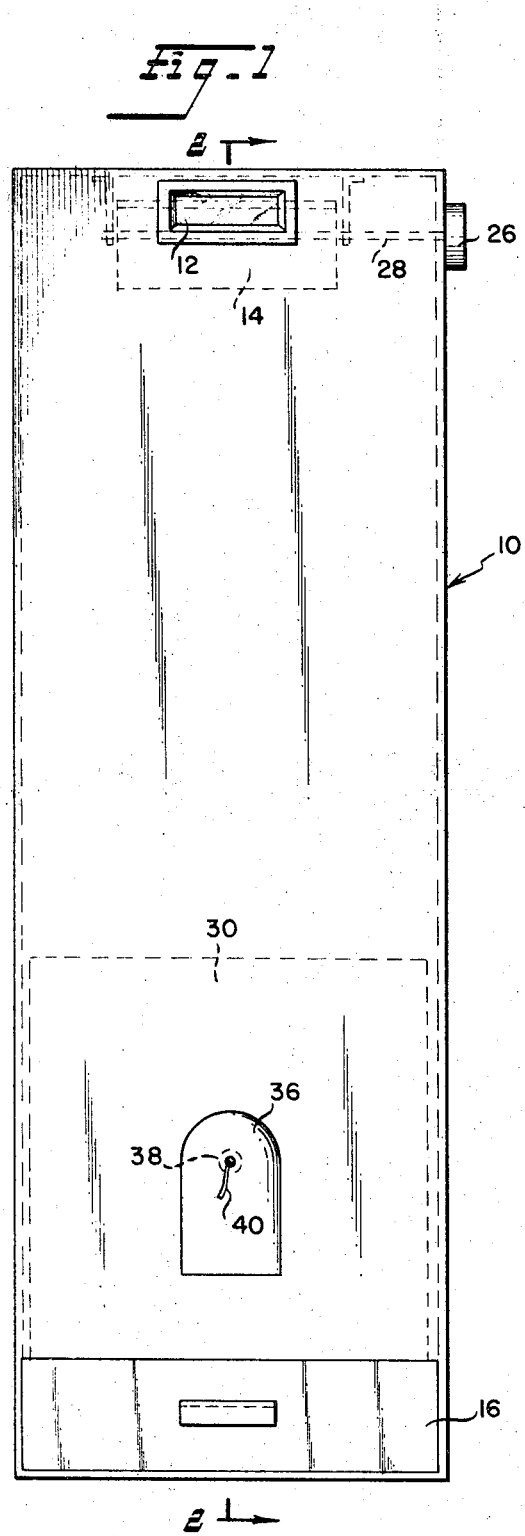
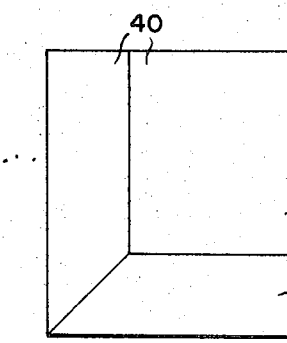
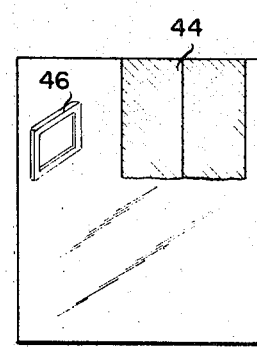
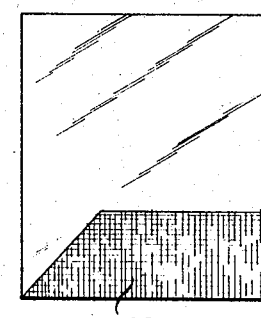
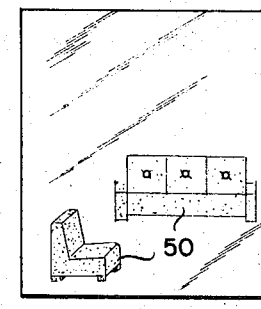
INVENTOR
Nicholas F. Abraham
BY *Schlesinger, Arkwright & Garvey*
ATTORNEYS Feb. 23, 1971 N. F. ABRAHAM 3,564,734
COLOR COLLATING DEVICE
Filed April 4, 1969 2 Sheets-Sheet 2
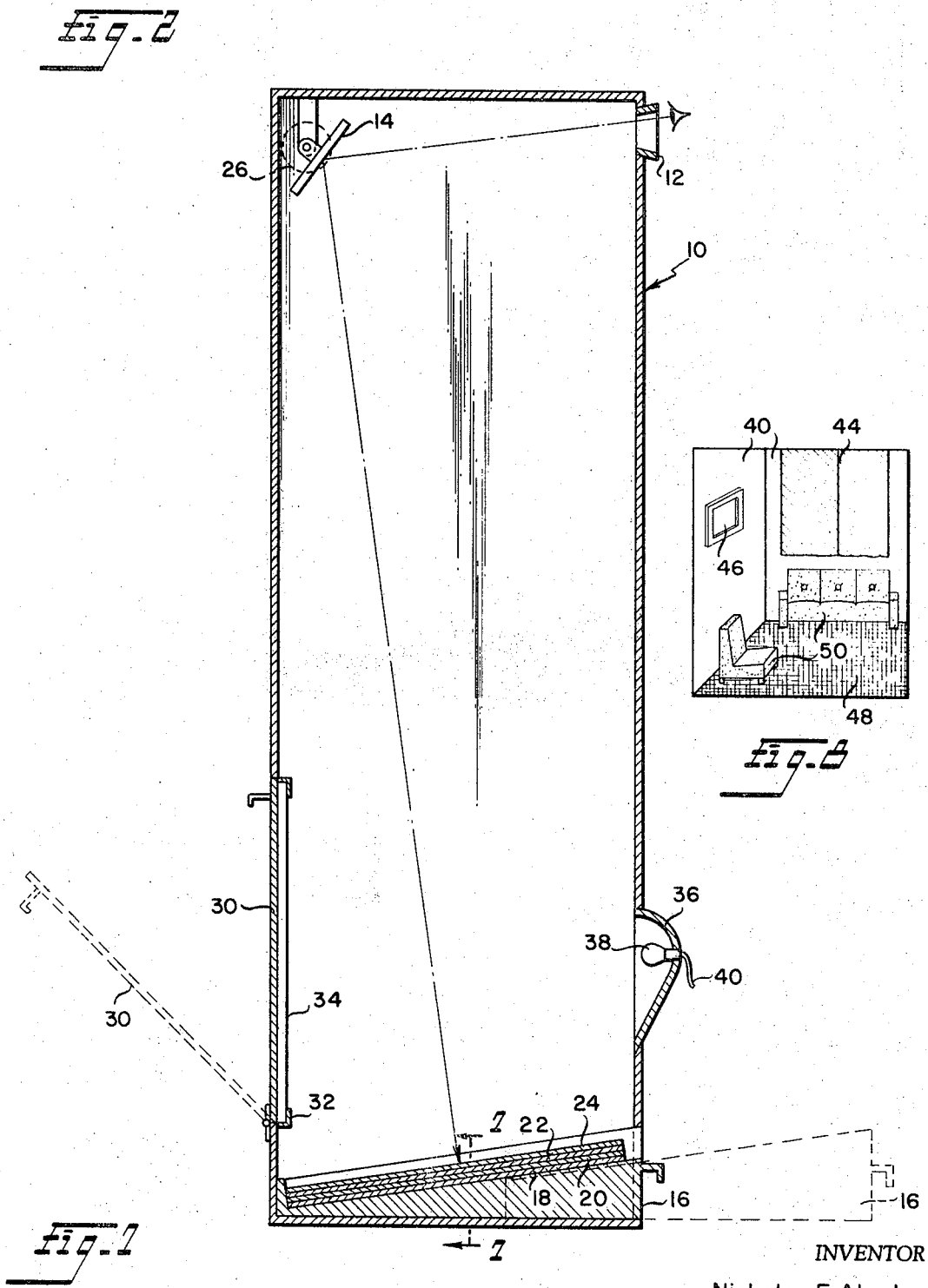
INVENTOR
Nicholas F. Abraham
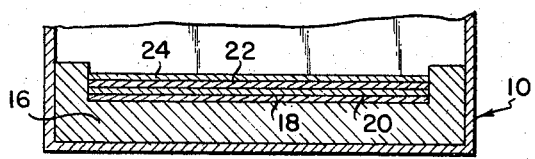
ATTORNEYS

United States Patent Office

3,564,734
Patented Feb. 23, 1971

3,564,734
COLOR COLLATING DEVICE
Nicholas F. Abraham, 70 Claremont St.,
Rochester, N.Y. 14621
Filed Apr. 4, 1969, Ser. No. 813,563
Int. Cl. G09b 25/00
U.S. Cl. 35—53                                   19 Claims

ABSTRACT OF THE DISCLOSURE

A color collating device for simulated article viewing including a closed housing, means for illuminating the interior of said housing, the housing including a viewing aperture and a colored member supported in the housing. A plate is provided having a mirrored portion in optical alignment with the viewing aperture, whereby when the colored member is illuminated, the mirrored portion of the plate means reflects the color of the colored member. The purpose of this device is to give a very graphic view of colors, shapes and textured surfaces to people who would have need of seeing how certain colors, textures, shapes, sizes and proportions would look before the actual items are made up.

BACKGROUND OF THE INVENTION

This invention relates to a device for collating a plurality of colors, and more specifically relates to a device whereby a simulated article design such as the outline of a piece of furniture may be given a colored appearance.

People who are decorating a room have long been faced with the problem of trying to determine how the room will look with different colors and textures of fabric, either on the furniture, the rug, the walls, or the draperies. After an article has been fabricated, it is quite expensive to change the color of the fabric to suit the buyer. Additionally, fabric samples cannot give an accurate appearance of the way that the article will appear when completed.

For these reasons, a need exists for a simple yet suitable means for viewing a simulated article of furniture before the fabric is finally applied to the article.

OBJECTS OF THE INVENTION

It is therefore a primary object of this invention to provide a device whereby a plurality of colors may be collated.

A further object of this invention is to provide an apparatus wherein a piece of furniture is given the appearance of having a desired type of fabric thereon.

Yet another object of this invention is to provide an apparatus whereby different simulated articles of furniture may be provided with different colored appearances.

A further object of this invention is to provide an apparatus of simple yet efficient construction for viewing colored, simulated articles of furniture.

Still another object of this invention is to provide a color collating device of the character described wherein the objects being viewed have a three dimensional appearance.

These and other objects and advantages of this invention will be apparent from the following description and claims.

DESCRIPTION OF DRAWINGS

FIG. 1 is a front elevational view of the apparatus of this invention;

FIG. 2 is a section along the line 2—2 of FIG. 1 viewed in the direction of the arrows;

FIGS. 3, 4, 5 and 6 are elevational views of the types of plates used in the apparatus of this invention;

FIG. 7 is a sectional view along the lines 7—7 of FIG. 2.

FIG. 8 is a view showing the image seen when the device of this invention is in operation.

DESCRIPTION OF THE INVENTION

In FIG. 1, a closed housing 10 is provided, having a viewing aperture 12 in optical alignment with a mirror 14.

In FIG. 2, a removable tray 16 is shown having a plurality of glass plates 18, 20, 22 and 24 supported thereon, and to be described later. Although four of these plates are shown, any suitable number of plates may be used to provide the desired effect.

A knob 26 is provided and connected through a suitable mechanism 28 for adjusting the mirror to provide optical alignment between viewing aperture 12 and plates 18, 20, 22, and 24.

At the rear of housing 10, a door 30 having a support member 32 is provided for removably retaining a piece of fabric 34. In this manner, the fabric may be readily changed at the will of the person using the apparatus.

Opposite the fabric 34 is provided a reflector 36 mounting light source 38. In the preferred embodiment, the light source is of a low intensity type to prevent excessive light interference and scattering. The light 38 is connected to a suitable source of electric current (not shown) by wire 40.

FIG. 3 illustrates the lower most plate 18, having a perspective outline of a room. Thus the walls are indicated 40, and the floors, 42.

FIG. 4 illustrates one possibility for the next plate and includes curtains 44 and picture 46. Although the curtains are shaded to indicate green, it is obvious that any color may be used.

FIG. 5 illustrates the next plate 22 having a rug 48 outlined thereon. The rug is shaded for gold.

FIG. 6 illustrates the upper most plate 24 and has articles of furniture 50 outlined thereon. The outlined shape is composed of a silvered or mirrored surface. In this manner, the color and texture of fabric 34 is reflected by the mirrored portion 50 of plate 24, while the colored portions of plates 18, 20, and 22 appear as they are colored. Thus, FIG. 8 illustrates how the overlay will appear when viewed through aperture 12.

A variety of different plates 18, 20 and 22 may be used to portray different colors for walls, curtains, tables, lamps, and the like, and in the preferred embodiment, the uppermost plate 24 has a mirrored portion outlined in the shape of the article whose color it is desired to change. Thus, by changing the fabric 34, various colors may be applied to the mirrored article shape. The plates 18, 20, 22, and 24 are removably positioned on tray 16 to facilitate changing of these plates for different articles, and together with the changeability of the fabric 34, great versatility is achieved in this apparatus.

An alternate embodiment would include having an additional plate on top of the plate 24. This additional plate could include colored portions in the shape of pillows which would appear superimposed upon mirrored portions 50.

An important effect obtained by means of the plurality of plates 18, 20, 22, and 24 is that the articles being viewed have a three dimensional appearance. This is probably due to the thickness of the plates and their indices of refraction.

Although the apparatus is illustrated as having an adjustable mirror 14, an alternate embodiment would provide a viewing aperture on the top of housing 10 whereby the plates would be viewed directly.

A further feature of this invention would provide that the plate 24 having only the mirrored outline of an article of furniture could be used. In this manner, the article could be seen as it would appear without any background arrangement.

While this invention has been described in connection with different embodiments thereof, it will be understood that it is capable of further modification, and this application is intended to cover any variations, uses, or adaptations of the invention following, in general, the principles of the invention and including such departures from the present disclosure has come within known or customary practice in the art to which the invention pertains, and as may be applied to the essential features hereinbefore set forth and as fall within the scope of the invention or the limits of the appended claims.

What I claim is:
1. A color collating device for simulated article viewing including:
   (a) a closed housing,
   (b) means for illuminating the inside of said housing,
   (c) said housing including a viewing aperture,
   (d) plate means having a mirror portion in optical alignment with said viewing aperture,
   (e) said mirror portion of said plate means having a simulated article design,
   (f) a colored member in said housing,
   (g) support means for said colored member connected to said housing,
   (h) said colored member being illuminated by said illuminating means and positioned in said housing when illuminated so as to be reflected in said mirror portion of said plate means,
   (i) whereby the simulated article design of said mirror portion of said plate means when viewed through said aperture will have the color of said colored member.
2. A color collating device as claimed in claim 1 and wherein:
   (a) said plate means includes a colored portion.
3. A color collating device as in claim 2 and wherein:
   (a) said plate means includes a plurality of stacked plates one of which includes said colored portion and the other of which includes said mirror portion.
4. A color collating device as in claim 3 and wherein:
   (a) said stacked plates are removably positioned in said housing.
5. A color collating device as in claim 4 and wherein:
   (a) the topmost plate of said stacked plates includes a mirror portion thereon.
6. A color collating device as in claim 5 and wherein:
   (a) each of the other of said stacked plates includes a colored portion thereon.
7. A color collating device as in claim 6 and wherein:
   (a) said colored portion has a simulated article design.
8. A color collating device as in claim 1 and wherein:
   (a) said colored member includes a piece of fabric.
9. A color collating device as in claim 7 and wherein:
   (a) said colored member includes a piece of fabric.
10. A color collating device as in claim 9 and wherein:
    (a) said colored member is removably positioned on said support means.
11. A color collating device as in claim 10 and wherein:
    (a) said support means includes a door having a support member thereon for supporting said colored member.
12. A color collating device as in claim 2 and including:
    (a) means for removably supporting said plate means.
13. A color collating device as in claim 11 and including:
    (a) means for removably supporting said plate means.
14. A color collating device as in claim 13 and wherein:
    (a) said means for removably supporting said plate means includes a removable tray member.
15. A color collating device as in claim 14 and wherein:
    (a) said illuminating means includes a low intensity light source.
16. A color collating device as in claim 1 and including:
    (a) an optical system between said viewing aperture and said plate means.
17. A color collating device as in claim 15 and including:
    (a) an optical system between said viewing aperture and said plate means.
18. A color collating device as in claim 17 and wherein:
    (a) said optical system is adjustable.
19. A color collating device as in claim 18 and wherein:
    (a) said optical system includes a mirror.

References Cited
UNITED STATES PATENTS
1,680,016  8/1928  Dawley _____ 35—58

HARLAND S. SKOGQUIST, Primary Examiner

U.S. Cl. X.R.
35—58